(12) United States Patent
Mori et al.

(10) Patent No.: US 7,491,664 B2
(45) Date of Patent: Feb. 17, 2009

(54) WET FRICTION MATERIAL

(75) Inventors: Masahiro Mori, Shizuoka (JP); Hirokazu Yagi, Shizuoka (JP); Sousuke Kawai, Shizuoka (JP)

(73) Assignee: NSK-Warner Kabushiki Kaisha, Tokyo (JP)

( * ) Notice: Subject to any disclaimer, the term of this patent is extended or adjusted under 35 U.S.C. 154(b) by 31 days.

(21) Appl. No.: 11/388,094

(22) Filed: Mar. 24, 2006

(65) Prior Publication Data

US 2006/0223907 A1 Oct. 5, 2006

(51) Int. Cl.
*B32B 5/02* (2006.01)
*B32B 9/00* (2006.01)

(52) U.S. Cl. .................. 442/157; 442/149; 428/391

(58) Field of Classification Search .......... 442/157, 442/149
See application file for complete search history.

(56) References Cited

U.S. PATENT DOCUMENTS 6,831,146 B2  12/2004  Aiba et al.

FOREIGN PATENT DOCUMENTS

JP  2002-363542 A  12/2002

*Primary Examiner*—Lynda Salvatore
(74) *Attorney, Agent, or Firm*—Sughrue Mion, PLLC

(57) ABSTRACT

The invention provides a wet friction material having high friction coefficient, excellent compression fatigue property and positive gradient of a μ-V property. The wet friction material contains a paper base material and a binder, in which the binder contains a cured material of a liquid resin composition obtained by mixing a hydrolyzed solution of a silane coupling agent represented by the following formula (1) and a resol-type phenol resin, and a weight ratio (S/R) between respective non-volatile components of the hydrolyzed solution (S) of the silane coupling agent and the resol-type phenol resin (R) is in the range of from 80/20 to 20/80: $(X)(R^1)_n Si(OR^2)_{3-n}$ (1), in which X represents an alkylamino group having a primary amine at a terminal; $R^1$ and $R^2$ each independently represent an alkyl group having from 1 to 3 carbon atoms; and n represents an integer of 0 or 1.

3 Claims, 2 Drawing Sheets

WET FRICTION MATERIAL

The present invention claims foreign priority to Japanese patent application No. P.2005-108620, filed on Apr. 5, 2005, the contents of which is incorporated herein by reference.

BACKGROUND OF THE INVENTION

1. Field of the Invention

The present invention relates to a wet friction material used in a friction engaging device such as a clutch or a brake employed within oil in an automatic transmission of, for example, a vehicle.

2. Related Background Art

A wet friction material has been used in an automatic transmission of an automatic vehicle and the like. The automatic transmission of the automatic vehicle involves a multi-plate clutch in which a plurality of friction plates each formed by sticking wet friction materials to surfaces of a metallic substrate (core plate) and a plurality of separator plates as friction counterpart materials each formed by a single plate such as a metallic plate are alternately arranged and is designed so that a driving force is transmitted by abutting these plates against each other or interrupting by releasing these plates from each other within ATF (automatic transmission fluid) used as a lubricating oil.

As a wet friction material used in the oil in this way, a wet friction material of paper type called as "paper friction material" is generally used. This wet friction material is generally formed by paper-making fiber base materials such as natural pulp fibers, organic synthetic fibers or inorganic fibers with filler such as diatom earth or a cashew resin and a friction regulator in a wet manner and, then, by impregnating a binder containing a thermosetting resin and, subsequently, by curing with heat. As a resin binder used on this occasion, a phenol resin having excellent heat resistance, high mechanical strength and a good compression fatigue property has conventionally been mainly used.

By the way, in a recent industrial field regarding automobiles, light weight and high efficiency of various parts have been sought in order to save energy and to achieve light weight. On the other hand, there is a tendency for seeking high rotation and high output of an automobile engine. Also in an automatic transmission, in order to cope with the compactness and light weight of the friction engaging device and the high rotation and high output of the automobile engine, regarding the wet friction material, enhancement of the friction coefficient and further improvements in heat-resistance and endurance have been sought.

In order to resolve these problems, a technique for compounding high hard filler such as alumina to the paper base material has been investigated. However, in this technique, although the friction coefficient is great in an initial engaging condition, since an attacking force against the friction counterpart material is strong, as the usage of the friction material is advanced, the friction coefficient is gradually decreased. Thus, this technique is not satisfactory. Further, in the past, resins other than the phenol resin used as the binder, for example, a silicone resin has also been investigated. The silicone resin has excellent heat resistance and endurance based on siloxane bonding of main structure and does not generate a burned area or peeling-off on a friction material under a high temperature/high load condition and has excellent long term stability of friction coefficient. Further, since the silicone resin is soft, a contact area thereof with the friction counter material at the time of abutting is increased and, then, the friction coefficient is increased; however, a compression fatigue property thereof is bad and a displacement amount of an entire thickness of the friction material becomes great and a problem of a long-term stability of friction property remains unsolved. Thus, a satisfactory friction material could not be obtained. Further, a $\mu$-V (friction coefficient versus velocity) property may have negative gradient, with the result that, when the friction material is used in a clutch, a transmission shock may occur.

That is to say, regarding the wet friction material, there is a need for seeking further improvement in three factors, that is, the high friction coefficient, the excellent compression fatigue property and the positive gradient of $\mu$-V property.

Aiming for solving these problems, for example, in Japanese Patent Unexamined Publication No. JP-A-2002-363542, a resin composition for wet friction material to be obtained by mixing a resol-type phenol resin and a hydrolyzed solution of alkoxysilane or a lower condensate thereof is disclosed. Compared with an ordinary phenol resin, the friction coefficient or heat resistance has been improved. However, the compression fatigue property, particularly, the displacement amount of the entire thickness of the friction material under a high pressure becomes great, compared with the ordinary phenol resin. Thus, it can not be said that the resin composition is satisfactory.

SUMMARY OF THE INVENTION

Therefore, an object of the present invention is to provide a wet friction material which has a high friction coefficient, an excellent compression fatigue property and a positive gradient of a $\mu$-V property.

In order to solve the aforementioned problems, the present inventors have focused attention on the fact that the silane coupling agent is widely used for improving performance of a composite material containing an organic polymer and an inorganic and/or metal material and intensively exerted studies thereon. The silane coupling agent is represented by the general formula $Z$-$SiY_3$ in which $Z$ represents a reactive organic functional group illustrated by an amino group, an epoxy group, a vinyl group, a methacryl group or a mercapto group; and $Y$ represents a hydrolyzable group illustrated by an alkoxy group. An action mechanism of the silane coupling agent is described below. The hydrolyzable group $Y$, for example, an alkoxy group, reacts with water to produce a silanol group which is, then, bonded to a hydroxy group in a surface of the inorganic material. On the other hand, the reactive organic functional group $Z$, for example, an amino group, reacts with the organic polymer such that the two groups are chemically bonded to each other. That is, the silane coupling agent acts as an intermediary between the inorganic material and the organic material, to thereby effectuate enhancement of physical strength, enhancement of the affinity of the inorganic material to the organic resin, suppression of reduction of physical strength under the condition of high temperature and high humidity, and so on. By utilizing such characteristics of the silane coupling agent as described above, the present inventors have exerted intensive studies aiming for development of a binder useful for the paper base material which is generally formed by organic materials such as natural pulp fibers or organic synthetic fibers and inorganic materials such as diatom earth and, as a result, have found that it is extremely effective in solving these problems to use a binder in which a hydrolyzed solution of a specified silane coupling agent and a resol-type phenol resin, to thereby accomplish the present invention.

According to a first aspect of the present invention, there is provided a wet friction material, comprising: a paper base material; and a binder,
  wherein the binder comprises a cured material of a liquid resin composition obtained by mixing:
    a hydrolyzed solution of a silane coupling agent represented by the following formula (1); and
    a resol-type phenol resin,
  wherein a weight ratio (S/R) between respective non-volatile components of the hydrolyzed solution (S) of the silane coupling agent and the resol-type phenol resin (R) is in a range of from 80/20 to 20/80:

$$(X)(R^1)_n Si(OR^2)_{3-n} \tag{1},$$

wherein X represents an alkylamino group having a primary amine at a terminal;
$R^1$ and $R^2$ each represents an alkyl group having from 1 to 3 carbon atoms; and
n represents an integer of 0 or 1.

According to a second aspect of the present invention, as set forth in the first aspect of the present invention, it is preferable that the hydrolyzed solution of the silane coupling agent contains water with an amount not smaller than the amount permitting hydrolyzing for half numbers of hydrolyzable groups contained in the silane coupling agent but not larger than three times as much as the amount permitting hydrolyzing for all the number of hydrolyzable groups contained in the silane coupling agent.

According to a second aspect of the present invention, as set forth in the first aspect of the present invention, it is preferable that the resol-type phenol resin is a resin which has a number average molecular weight of from 150 to 400 and is obtained by blending any one of phenols (P) and any one of aldehydes (A) at a molar ratio (A/P) of from 0.8 to 1.4.

According to the invention as set forth in the first aspect of the present invention, in the wet friction material containing the paper base material and the binder, since the binder is allowed to be a cured product of a liquid resin composition to be obtained by mixing the hydrolyzed solution of the specified silane coupling agent and the resol-type phenol resin at a specified ratio, the friction material which can attain not only the high friction coefficient but also the excellent compression fatigue property and the positive gradient of the µ-V property can be provided. By this, trends toward the compactness and light weight of the friction engaging device in the automatic transmission and, also, trends toward the high rotation and high output of the automobile engine can sufficiently be responded. Further, when the friction material is used in a clutch, a transmission shock can be prevented.

Still further, according to the invention as set forth in the second aspect of the present invention, in the hydrolyzed solution of the silane coupling agent, by allowing an amount of water to be added to be in a specified range, the non-reacted alkoxy group does not remain in a large quantity in the hydrolyzed solution, hardenability is not affected and, then, productivity is not deteriorated. On the other hand, by arranging such that an excess amount of water does not remain in a large amount in the hydrolyzed solution, a content of cured product is allowed to be uniform in a direction of thickness of the friction material, to thereby suppress a bad influence on physical strength and a friction property.

Even still further, according to the invention as set forth in the third aspect of the present invention, by setting the reaction molar ratio between any one of the phenols and any one of the aldehydes to be in a specified range, a remaining amount of non-reacted phenol monomer is suppressed to be a low level, to thereby prevent reduction of yield of the resin.

Further, by suppressing unduly increasing of a crosslink density of the phenol resin, the cured product is prevented from being unduly hard and, accordingly, the displacement amount of the entire thickness of the wet friction material is suppressed to be small. Still further, by setting the number average molecular weight to be in a specified range, the non-reacted phenol is prevented from being increased and, also, hardenability is prevented from being reduced. Even still further, the viscosity of the resin is prevented from being increased and, also, compatibility of aminosilane to the hydrolyzed solution is prevented from being reduced.

BRIEF DESCRIPTION OF THE DRAWINGS

FIG. 3 is a graph showing comparisons of displacement amounts of entire thickness in Examples and Comparative Examples.

DETAILED DESCRIPTION OF THE PREFERRED EMBODIMENTS

Figure 1:
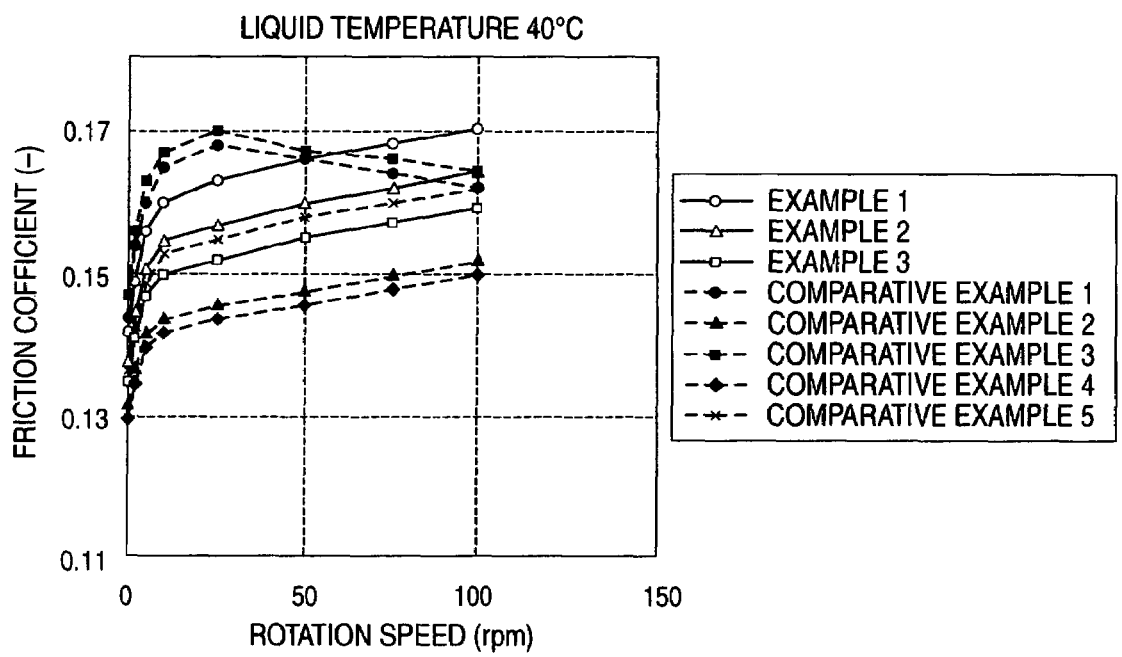
FIG. 1 is a graph showing comparisons of µ-V properties of wet friction materials in Examples and Comparative Examples at an oil temperature of 40° C.

Now, a wet friction material according to the present invention will be specifically explained with reference to the preferred embodiments. In the wet friction material according to the present invention which contains a paper base material and a binder, a cured product of a liquid resin composition obtained by mixing a hydrolyzed solution of a predetermined silane coupling agent and a resol-type phenol resin is used as a binder. Then, a weight ratio of respective non-volatile components of the hydrolyzed solution of the silane coupling agent and the resol-type phenol resin is adjusted to be in a specified range.

A paper base material used in the present invention is made into paper in a normal manner from slurry liquid obtained by dispersing, in water, fiber base materials involving natural pulp fibers such as wood pulp, organic synthetic fibers such as aramid and inorganic fibers such as glass, fillers such as diatom earth and a cashew resin, and a friction regulator. However, the present invention is not limited thereto.

The hydrolyzed solution of the silane coupling agent as a base of the binder is prepared by putting a silane coupling agent, water and, if necessary, a solvent in a reactor and by stirring the resultant mixture at room temperature or at a relatively low temperature for a predetermined time. In order to control hydrolysis of the silane coupling agent and a condensation reaction, an acid or abase may sometimes be added.

As the silane coupling agent, aminosilane which is excellent in permeability and adhesiveness to the paper base material and is represented by the following formula (1) can be used:

$$(X)(R^1)_n Si(OR^2)_{3-n} \tag{1}$$

in which X represents an alkylamino group containing a primary amine at a terminal;
$R^1$ and $R^2$ each represents an alkyl group having from 1 to 3 carbon atoms; and
n represents an integer of 0 or 1.

Specifically, examples of aminosilane containing three alkoxy groups in one molecule include 3-aminopropyl trimethoxysilane, 3-aminopropyl triethoxysilane, and N-2-(aminoethyl) 3-aminopropyl trimethoxysilane. One kind selected from these may be used or a mixture of two or more kinds selected from these may be used. Further, examples of aminosilane containing two alkoxy groups in one molecule include 3-aminopropyl methyl dimethoxysilane, 3-aminopropyl methyl diethoxysilane, N-2-(aminoethyl) 3-aminopropylmethyl dimethoxysilane, and N-2-(aminoethyl) 3-aminopropylmethyl diethoxysilane. One kind selected from these may be used or a mixture of two or more kinds selected from these may be used.

The amount of water to be added is not smaller than the amount permitting hydrolyzing for half the number of alkoxy groups contained in the aminosilane and also not larger than three times as much as the amount permitting hydrolyzing for all the number of hydrolyzable groups. When the amount of water is smaller than the amount permitting hydrolyzing for half the number of hydrolyzable groups, a large number of non-reacted alkoxy groups remain in the hydrolyzed solution so that hardenability is deteriorated. This is undesirable from the point of view of productivity and energy saving as well. When the amount of water to be added is contrarily unduly large, an excessive amount of water remains in the hydrolyzed solution. As a result, the amount of the hardened substance becomes uneven in a direction of the thickness of the friction material so that the unevenness has a bad influence on physical strength and friction property.

The solvent is not always essentially required but aminosilane in the starting mixture solution is preferably diluted with a lower alcohol such as methanol, ethanol, or propanol so that the aminosilane concentration is not higher than 80% by weight. When the aminosilane concentration is higher than 80% by weight, a condensation reaction of silanol groups produced by hydrolysis is accelerated so that storage stability of the hydrolyzed solution may be spoiled.

An acid or a base is not always an essential component and is sometimes used for control the hydrolysis and a condensation reaction of aminosilane. As for such acids, hydrochloric acid, sulfuric acid, nitric acid, acetic acid, and hydrofluoric acid are mentioned. As for such bases, ammonia can be mentioned. However, the present invention is not particularly limited to those acids and bases.

In the present invention, the resol-type phenol resin which is another component of a base of the binder can be obtained by allowing any one of phenols and any one of aldehydes to react with each other in the presence of a basic catalyst. On this occasion, examples of the phenols include phenol, cresol, xylenol, m-cresol, m-ethyl phenol, resorcin and bisphenol-A, and the present invention is not particularly limited thereto. These phenols may be used singly or in combinations. Further, examples of the aldehydes include paraformaldehyde, formaldehyde, trioxane, acetaldehyde, and benzaldehyde and the present invention is not particularly limited thereto. These aldehydes may be used singly or in combinations.

Although a reaction molar ratio (A/P) between any one of the phenols (P) and any one of the aldehydes (A) is not particularly limited, the reaction molar ratio is preferably in the range of from 0.8 to 1.4. When the reaction molar ratio is below the lower limit of the above-described range, non-reacted phenol monomer may be increased and, then, yield of the resin is decreased, which is not preferred; whereas, when the reaction molar ratio exceeds the upper limit of the above-described range, since the crosslink density of the phenol resin becomes unduly high, the cured product becomes harder, with the result that the displacement amount of the entire thickness of the wet friction material becomes great, which is not preferred.

Further, a number average molecular weight of the resol-type phenol resin is not particularly limited, the number average molecular weight is preferably in the range of from 150 to 400. Note that the number average molecular weight is a molecular weight calculated in equivalent in polystyrene by using high-performance liquid chromatography. When the number average molecular weight of the phenol resin is below the above-described lower limit, the non-reacted phenol monomers may be increased and the hardenability is decreased. On the other hands, the number average molecular weight excesses the above-described upper limit, viscosity of the resin may be increased and the compatibility of aminosilane to the hydrolyzed solution is deteriorated.

Examples of the basic catalysts include alkalis such as sodium hydroxide, potassium hydroxide, barium hydroxide and calcium hydroxide, and amines such as ammonia, triethyl amine, and triethanol amine. These basic catalysts maybe used singly or in combinations.

Regarding a mixing ratio between the hydrolyzed solution (S) of aminosilane and the resol-type phenol resin (R), a weight ratio (S/R) of non-volatile components thereof after subjected to a heating treatment of one hour at 135° C. is adjusted to be in the range of from 80/20 to 20/80. When the non-volatile component of the aminosilane is less than 20% by weight of the entire non-volatile components, the effect for enhancing the friction coefficient or the heat resistance may not be achieved, whereas, when such non-volatile component is more than 80% by weight, the binder becomes unduly soft to increase the displacement amount of the entire thickness and the μ-V property may sometimes be in a negative gradient.

A method for mixing the hydrolyzed solution of aminosilane and the resol-type phenol resin is not limited to a particular manner and, for example, while stirring a given amount of the resol-type phenol resin, the hydrolyzed solution of aminosilane is gradually added thereto, to thereby obtain a uniform mixed solution which has been mixed with a predetermined amount of the hydrolyzed solution of aminosilane.

As methods for impregnating the liquid resin composition obtained by mixing the hydrolyzed solution of aminosilane and the resol-type phenol resin to the paper base material, for example, there are a method for dipping the paper base material into the liquid resin composition, a method for coating the liquid resin composition by means of any one of various coaters, a method for spraying the liquid resin composition by means of a spray and the like. Among these methods, the method for dipping the paper base material into the liquid resin composition is preferred. With this method, the impregnating ability of the resin for friction material with respect to the paper base material can be enhanced.

After the liquid resin composition is impregnated into the paper base material, the paper base material is ordinarily dried, for example, by heating at from 80 to 120° C. for 5 to 30 minutes and, then, curing at from 150 to 230° C. for 10 to 50 minutes.

Although a pore ratio of the friction material according to the present invention is not limited specially, the pore ratio is, preferably, in the range of from 20% to 70% and, more preferably, in the range of from 30% to 60%. When the pore ratio is below the lower limit of the above-described range, a sucking and exhausting efficiency of ATF may be reduced to reduce the effect for enhancing the endurance, whereas, when the pore ratio exceeds the upper limit of the above-described range, the strength of the friction material may be reduced.

As mentioned above, according to the present invention, in order to achieve the high friction coefficient and enhancement of the heat resistance and the positive gradient of the μ-V property requested in the wet friction material, the binder is the cured product of the liquid resin composition obtained by mixing the hydrolyzed solution of aminosilane and the resol-type phenol resin and the weight ratio (S/R) between respective non-volatile components of the hydrolyzed solution (S) of the silane coupling agent and the resol-type phenol resin (R) is adjusted to be in the range of from 80/20 to 20/80.

In the wet friction material according to the present invention, by using the binder produced by mixing the hydrolyzed solution of aminosilane which is excellent in permeability and adhesiveness to the paper base material, soft and excellent in heat resistance and the phenol resin which is excellent in compression fatigue property at a specified range, high friction coefficient and a positive gradient property of the μ-V property can be secured without impairing the compression fatigue property of the friction material.

EXAMPLES

Now, embodiments of the present invention and comparative examples will specifically be described in detail with reference to the accompanying drawings. Incidentally, the embodiments are given to illustrate the present invention and should not be interpreted as limiting it in any way. Unless stated otherwise, the terms "part" and "%" in this specification all indicate "part by weight" and "% by weight", respectively.

Manufacture of Paper Base Material

A mixture containing cellulose fibers of 35% and aramid fibers of 20% as fiber base components and diatom earth of 45% as fillers is dispersed in water to obtain a slurry liquid, and a paper is made from the slurry liquid and is dried to manufacture a paper base material used in the present invention.

Manufacture of Hydrolyzed Solution of Aminosilane

For Examples 1 to 3 and Comparative Examples 1 to 3 as will hereinafter be described in detail, the hydrolyzed solution of aminosilane is obtained as following.

A flask equipped with a stirrer, a reflux condenser, and a thermometer was charged with 1253 parts of 3-aminopropyl trimethoxysilane (KBM903: trade name; manufactured by Shin-Etsu Chemical Co., Ltd.) and, then, diluted with 455 parts of methanol, added in drops with 378 parts of purified water and allowed to react for 5 hours at 40° C., to thereby obtain a hydrolyzed solution of 3-aminopropyl trimethoxysilane. A content of non-volatile components of the resulting solution after a heat treatment for one hour at 135° C. was 40%.

Manufacture of Hydrolyzed Solution of Alkoxysilane

For Comparative Example 5 as will hereinafter be described in detail, the hydrolyzed solution of alkoxysilane is obtained as following.

A flask equipped with a stirrer, a reflux condenser, and a thermometer was charged with 1260 parts of lower condensate of tetramethoxysilane (methyl silicate 51: trade name; manufactured by Colcoat Co., Ltd.), 858 parts of methanol, 20 parts of 1N hydrochloric acid and 126 parts of purified water, in dropping manners and, then, allowed to react for 3 hours at 40° C., to thereby obtain a hydrolyzed solution of lower condensate of tetramethoxysilane. A content of non-volatile components of the resulting solution after a heat treatment for one hour at 135° C. was 40%.

Manufacture of Resol-type Phenol Resin

A flask equipped with a stirrer, a reflux condenser, and a thermometer was charged with 1000 parts of phenol and 1050 parts of 37% formalin, and 10 parts of 20% sodium hydroxide and, then, allowed to react for 1 hours at 100° C. and, thereafter, dehydrated under a reduced pressure of about 870 hPa (650 mmHg) and, when a temperature of the resultant solution reaches 70° C., the solution was added with 750 parts of methanol, to thereby obtain a liquid resol-type phenol resin having a number average molecular weight of 260. A content of non-volatile components of the resulting solution after a heat treatment for one hour at 135° C. was 50%.

Manufacture of Liquid Resin Composition

The thus obtained hydrolyzed solution (content of non-volatile component: 40%) of aminosilane and resol-type phenol resin (content of non-volatile component: 50%) are mixed with each other, to thereby manufacture various types of liquid resin compositions (A to E) as shown in Table 1.

TABLE 1

Mixing ratios of types of liquid resin compositions

| | Hydrolyzed solution of aminosilane (S) | Resol-type phenol resin (R) | Mixing ratio(*) (S/R) |
|---|---|---|---|
| Liquid resin composition A | 100 parts | 20 parts | 4/1 |
| Liquid resin composition B | 100 parts | 80 parts | 1/1 |
| Liquid resin composition C | 40 parts | 100 parts | 8/25 |
| Liquid resin composition D | 100 parts | 10 parts | 8/1 |
| Liquid resin composition E | 10 parts | 100 parts | 2/25 |

(*)weight ratio of non-volatile components

Example 1

The above-described liquid resin composition A was diluted by methanol and the resulting liquid was impregnated into the paper base material and then, the impregnated paper base material was dried and, subsequently, cured by heating it at a temperature of 150° C. for 30 minutes. In this way, a wet friction material having the paper base material of 100 parts and the binder of 40 parts was obtained. Then, the friction material was punched to obtain a ring having an outer diameter of 130 mm and an inner diameter of 100 mm, and the ring was held in a mold, which is heated to a temperature of 200° C., at pressure greater than 4.9 MPa for 30 seconds to integrate it with a ring-shaped core plate, to thereby obtain a friction plate having a diameter of 130 mm and a thickness of 2.3 mm.

Example 2

A friction plate having a diameter of 130 mm and a thickness of 2.3 mm was obtained in a same manner as in Example 1 except that the above-described liquid resin composition B was used as the binder for the wet friction material.

Example 3

A friction plate having a diameter of 130 mm and a thickness of 2.3 mm was obtained in a same manner as in Example 1 except that the above-described liquid resin composition C was used as the binder for the wet friction material.

Comparative Example 1

A friction plate having a diameter of 130 mm and a thickness of 2.3 mm was obtained in a same manner as in Example 1 except that the above-described liquid resin composition D was used as the binder for the wet friction material.

Comparative Example 2

A friction plate having a diameter of 130 mm and a thickness of 2.3 mm was obtained in a same manner as in Example 1 except that the above-described liquid resin composition E was used as the binder for the wet friction material.

Comparative Example 3

A friction plate having a diameter of 130 mm and a thickness of 2.3 mm was obtained in a same manner as in Example 1 except that the hydrolyzed solution of aminosilane was used singly as the binder for the wet friction material.

Comparative Example 4

A friction plate having a diameter of 130 mm and a thickness of 2.3 mm was obtained in a same manner as in Example 1 except that the resol-type phenol resin was used singly as the binder for the wet friction material.

Comparative Example 5

A friction plate having a diameter of 130 mm and a thickness of 2.3 mm was obtained in a same manner as in Example 1 except that the liquid resin composition obtained by mixing 100 parts of the hydrolyzed solution of alkoxysilane and 80 parts of the resol-type phenol resin was used singly as the binder for the wet friction material.

μ-V Property

Evaluations as described below were carried out on the friction plates obtained in Examples 1 to 3 and Comparative Examples 1 to 5 by using a friction performance testing machine (SAE No. 2). Evaluation methods and results are shown below.

The μ-V property was evaluated under the testing conditions described in Table 2. Results are shown in FIGS. 1 and 2.

TABLE 2

| μ-V property testing condition | |
|---|---|
| Testing item | Test condition |
| Revolution (rpm) | 0.72, 2, 5, 10, 25, 50, 75, 100 |
| Surface pressure | 785 kPa |
| Inertia | 0.343 N · m · s² |
| Number of friction face | 6 faces |
| Oil amount | Oil bath 700 ml |
| Oil temperature | 40° C. (FIG. 1), 100° C. (FIG. 2) |

Figure 2:
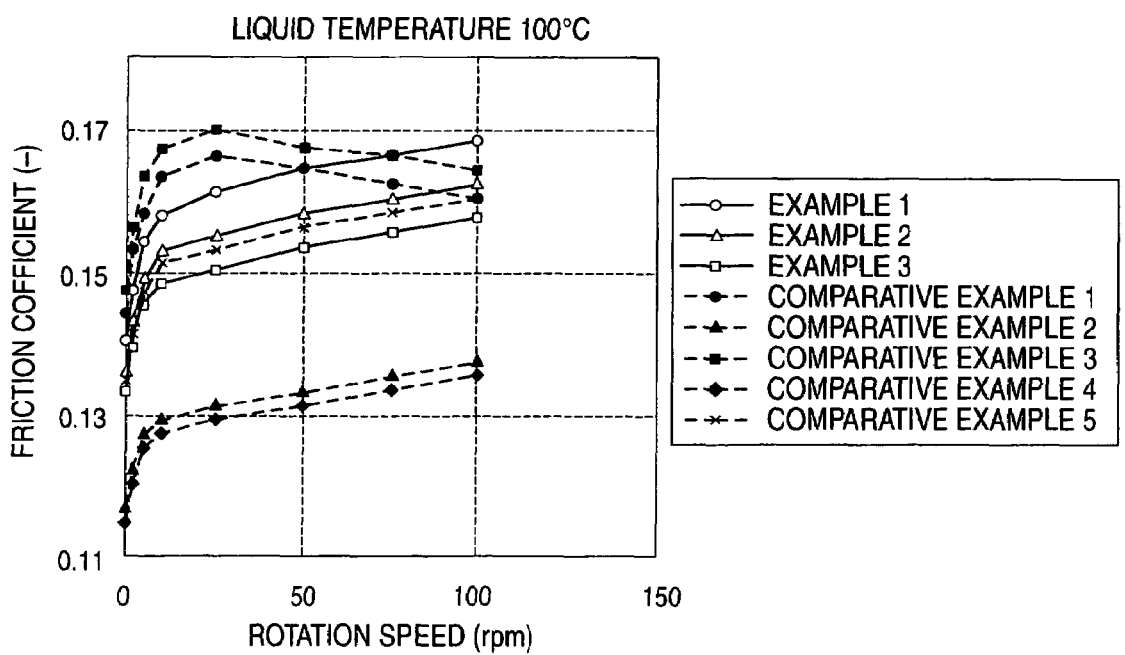
FIG. 2 is a graph showing comparisons of µ-V properties of wet friction materials in Examples and Comparative Examples at an oil temperature of 100° C.

As can be seen from FIGS. 1 and 2, in the wet friction materials in Examples 1 to 3 and Comparative Example 5, in comparison with the wet friction material in Comparative Example 4 in which a conventional phenol resin was used as a binder, μ (friction coefficient) is high and is not so much reduced under a high temperature and, accordingly, temperature dependency of the friction coefficient is small. Further, the wet friction materials of Examples 1 to 3 and Comparative Example 5 is excellent in positive gradient of μ-V property; that is, an increasing amount of μ is increased as a speed is increased. In Comparative Example 3 in which the hydrolyzed solution of aminosilane was used singly as the binder, μ is high in a same was as in Examples 1 to 3; however, when the μ-V property exceeds a given speed range (about 25 rpm), it takes a negative gradient. Although the wet friction material in Comparative Example 1 uses the hydrolyzed solution of aminosilane and the liquid resin composition of the resol-type phenol resin as the binder, since a mixing ratio of the resol-type phenol resin is small, it behaves in a same manner as in Comparative Example 1, that is, although μ is high, when the μ-V property exceeds a given speed range (about 25 rpm), it takes a negative gradient. Although the wet friction material in Comparative Example 2 uses the hydrolyzed solution of aminosilane and the liquid resin composition of the resol-type phenol resin as the binder, since a mixing ratio of the hydrolyzed solution of aminosilane is small, μ is low.

Compression fatigue property

The compression fatigue property was evaluated under the testing conditions described in Table 3. Further, relative merits of the compression fatigue property were evaluated in accordance with dimensions of the displacement amounts of the entire thickness before and after the tests. Results are shown in FIG. 3.

TABLE 3

| Compression fatigue property testing condition | |
|---|---|
| Testing item | Test condition |
| Revolution (rpm) | 3600 |
| Surface pressure | 1570 kPa |
| Inertia | 0.343 N · m · s² |
| Number of friction face | 6 faces |
| Oil amount | Oil bath 700 ml |
| Oil temperature | 100° C. |
| Number of cycle | 5000 cycles |

As can be seen from FIG. 3, in the wet friction materials in Examples 1 to 3, each displacement amount of entire thickness is small in a same manner as in the wet friction material in Comparative Example 4 in which a conventional phenol resin was used as the binder and is excellent in the compression fatigue property, in comparison with the wet friction material in Comparative Example 3 in which the hydrolyzed solution of aminosilane was used singly as the binder and that in Comparative Example 5 in which the hydrolyzed solution of alkoxysilane and the liquid resin composition of the resol-type phenol resin were used as the binder. In the wet friction material in Comparative Example 1, although the hydrolyzed solution of aminosilane and the liquid resin composition of the resol-type phenol resin were used as the binder, since the mixing ratio of the resol-type phenol resin is small, the displacement amount of the entire thickness is great and, then, the compression fatigue property was inferior.

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A wet friction material, comprising: a paper base material; and a binder,
wherein the binder comprises a cured material of a liquid resin composition obtained by mixing:
a hydrolyzed solution of a silane coupling agent represented by the following formula (1); and
a resol-type phenol resin,
wherein a weight ratio (S/R) between respective non-volatile components of the hydrolyzed solution (S) of the silane coupling agent and the resol-type phenol resin (R) is in a range of from 80/20 to 20/80:

$$(X)(R^1)_n Si(OR^2)_{3-n} \qquad (1),$$

wherein X represents an alkylamino group having a primary amine at a terminal;

$R^1$ and $R^2$ each represents an alkyl group having from 1 to 3 carbon atoms; and n represents an integer of 0 or 1; wherein the wet friction material has a positive gradient in μ-V characteristic property.

2. The wet friction material according to claim 1, wherein the hydrolyzed solution of the silane coupling agent contains water in an amount not smaller than the amount permitting hydrolysis of half numbers of hydrolyzable groups contained in the silane coupling agent, but not larger than three times as much as the amount permitting hydrolysis of all the number of hydrolyzable groups contained in the silane coupling agent.

3. The wet friction material according to claim 1, wherein the resol-type phenol resin is a resin which has a number average molecular weight of from 150 to 400 and is obtained by blending any one of phenols (P) and any one of aldehydes (A) at a molar ratio (A/P) of from 0.8 to 1.4.

* * * * *

UNITED STATES PATENT AND TRADEMARK OFFICE
CERTIFICATE OF CORRECTION

| | | |
|---|---|---|
| PATENT NO. | : 7,491,664 B2 | Page 1 of 1 |
| APPLICATION NO. | : 11/388094 | |
| DATED | : February 17, 2009 | |
| INVENTOR(S) | : Masahiro Mori, Hirokazu Yagi and Sousuke Kawai | |

It is certified that error appears in the above-identified patent and that said Letters Patent is hereby corrected as shown below:

Title Pg, insert the following:

--(30) Foreign Application Priority Data

April 5, 2005 (JP).....................2005-108620--

Signed and Sealed this

Third Day of November, 2009

David J. Kappos
*Director of the United States Patent and Trademark Office*